US008811600B2

(12) United States Patent
Cendrillon et al.

(10) Patent No.: US 8,811,600 B2
(45) Date of Patent: Aug. 19, 2014

(54) OPTIMIZING THE TRANSMIT POWER SPECTRUM DENSITY (PSD) OF A REMOTELY DEPLOYED LINE TO ENSURE SPECTRAL COMPATIBILITY

(75) Inventors: Raphael Jean Cendrillon, Hong Kong (CN); Guozhu Long, Fremont, CA (US); Dong Wei, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 382 days.

(21) Appl. No.: 12/634,994

(22) Filed: Dec. 10, 2009

(65) Prior Publication Data

US 2010/0246606 A1 Sep. 30, 2010

Related U.S. Application Data

(60) Provisional application No. 61/165,172, filed on Mar. 31, 2009.

(51) Int. Cl.
*H04M 1/00* (2006.01)

(52) U.S. Cl.
USPC ....... 379/399.01; 379/414; 375/220; 370/480

(58) Field of Classification Search
USPC .......... 370/278, 293, 431, 464, 480; 375/219, 375/222, 260, 377, 220; 379/27.01, 32.04, 379/399.01, 414
See application file for complete search history.

(56) References Cited

U.S. PATENT DOCUMENTS

| | | | |
|---|---|---|---|
| 5,903,608 A * | 5/1999 | Chun | 375/260 |
| 6,988,212 B1 | 1/2006 | Hamdi | |
| 7,460,588 B2 | 12/2008 | Rhee et al. | |

(Continued)

FOREIGN PATENT DOCUMENTS

| | | |
|---|---|---|
| CN | 1578186 A | 2/2005 |
| CN | 1866938 A | 11/2006 |

(Continued)

OTHER PUBLICATIONS

Cendrillon, Raphael, et al., "Iterative Spectrum Balancing for Digital Subscriber Lines," 2005 IEEE International Conference on Communications, ICC 2005, vol. 3, May 2005, pp. 1937-1941.

(Continued)

*Primary Examiner* — Edan Orgad
*Assistant Examiner* — Curtis A Alia
(74) *Attorney, Agent, or Firm* — Conley Rose, P.C.; Grant Rodolph

(57) ABSTRACT

An apparatus comprising a transmitter at a digital subscriber line (DSL) Cabinet configured to transmit a downstream signal in a subscriber line according to a power spectral density (PSD) configuration, wherein the PSD configuration comprises a cutoff frequency based on a required data-rate of the subscriber line. Also included is an apparatus comprising at least one processor configured to implement a method comprising determining a downstream PSD for a PSD mask for a DSL, determining a cutoff frequency for the PSD profile based on a data-rate required for the DSL, and adjusting a downstream signal power on the DSL according to the PSD mask. Included is a method comprising configuring a plurality of transmitted PSDs for a plurality of Exchange deployed lines and Cabinet deployed lines by varying a plurality of cutoff frequencies corresponding to the transmitted PSDs, wherein the cutoff frequencies are varied by line, with time, or both.

25 Claims, 6 Drawing Sheets

(56) References Cited

U.S. PATENT DOCUMENTS

| | | | |
|---|---|---|---|
| 7,593,458 | B2 | 9/2009 | Cioffi |
| 7,633,999 | B2* | 12/2009 | Duvaut et al. ............... 375/222 |
| 2003/0086486 | A1* | 5/2003 | Graziano et al. ............ 375/222 |
| 2003/0223482 | A1* | 12/2003 | Oksman et al. .............. 375/222 |
| 2003/0227938 | A1 | 12/2003 | Slabbinck et al. |
| 2004/0264559 | A1* | 12/2004 | Cendrillon et al. .......... 375/219 |
| 2005/0123027 | A1* | 6/2005 | Cioffi et al. ................. 375/222 |
| 2005/0123028 | A1* | 6/2005 | Cioffi et al. ................. 375/222 |
| 2007/0280334 | A1 | 12/2007 | Lv et al. |
| 2008/0013611 | A1* | 1/2008 | Stolle .......................... 375/222 |
| 2008/0123725 | A1 | 5/2008 | J et al. |
| 2008/0212614 | A1* | 9/2008 | Zhou ............................ 370/496 |
| 2008/0212768 | A1 | 9/2008 | Zhou et al. |
| 2009/0268601 | A1 | 10/2009 | Fang et al. |

FOREIGN PATENT DOCUMENTS

| | | |
|---|---|---|
| CN | 1961530 A | 5/2007 |
| CN | 101047459 A | 10/2007 |
| CN | 101047682 A | 10/2007 |
| CN | 101083553 A | 12/2007 |
| CN | 101133564 A | 2/2008 |
| CN | 101174855 A | 5/2008 |
| CN | 101237317 A | 8/2008 |
| EP | 1670202 A1 | 6/2006 |
| WO | 2008044975 A1 | 4/2008 |
| WO | 2008094082 A1 | 8/2008 |
| WO | 2008145538 A1 | 12/2008 |

OTHER PUBLICATIONS

Cendrillon, Raphael, et al., "Optimal Multiuser Spectrum Balancing for Digital Subscriber Lines," IEEE Transactions on Communications, vol. 54, No. 5, May 2006, pp. 922-933.

Yu, Wei, et al., "Distributed Multiuser Power Control for Digital Subscriber Lines," IEEE Journal on Selected Areas in Communications, Special Issue on Twisted Pair Transmission, vol. 20, No. 5, Jun. 2002, pp. 1105-1115.

"Dynamic Spectrum Management," ATIS-PP-0600007, Pre-published American National Standard for Telecommunications; 2007.

"Series G: Transmission Systems and Media, Digital Systems and Networks—Digital Sections and Digital Line System—Access Networks—Asymmetric Digital Subscriber Line (ADSL) Transceivers—Extended Bandwidth ADSL2 (ADSL2plus)", ITU-T Recommendation G.992.5, (Jan. 2009).

"Series G: Transmission Systems and Media, Digital Systems and Networks—Digital Sections and Digital Line system—Access Networks—Very High Speed Digital Subscriber Line Transceivers 2 (VDSL2)," ITU-T Recommendation G.993.2 (Feb. 2006).

"Series G: Transmission Systems and Media, Digital Systems and Networks—Digital Transmission Systems—Digital Sections and Digital Line System—Access Networks—Physical Layer Management for Digital Subscriber Line (DSL) Transceivers," ITU-T Recommendation G.997.1, (Jun. 1999).

"Physical Layer Management for Digital Subscriber Line (DSL) Transceivers," Series G: Transmission Systems and Media, Digital Systems and Networks—Digital Sections and Digital Line System—Access Networks, ITU-T G. 997.1, Jun. 2006, 104 pages.

Foreign Communication From a Related Counterpart Application, PCT Application PCT/CN2010/071465, International Search Report dated Jul. 15, 2010, 4 pages.

Foreign Communication From a Related Counterpart Application, PCT Application PCT/CN2010/071465, Written Opinion dated Jul. 15, 2010, 6 pages.

Foreign Communication From a Counterpart Application, Chinese Application No. 201080002618.1, Chinese Office Action dated Jun. 5, 2013, 7 pages.

Foreign Communication From a Counterpart Application, Chinese Application No. 201080002618.1, Partial English Translation of Chinese Office Action dated Jun. 5, 2013, 7 pages.

* cited by examiner

US 8,811,600 B2

OPTIMIZING THE TRANSMIT POWER SPECTRUM DENSITY (PSD) OF A REMOTELY DEPLOYED LINE TO ENSURE SPECTRAL COMPATIBILITY

CROSS-REFERENCE TO RELATED APPLICATIONS

The present application claims priority to U.S. Provisional Patent Application No. 61/165,172 filed Mar. 31, 2009 by Raphael Jean Cendrillon, et al. and entitled, "Optimizing the Transmit Power Spectrum Density (PSD) Of A Remotely Deployed Line to Ensure Spectral Compatibility," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide large bandwidth for digital communications over existing subscriber lines. When transmitting data over the subscriber lines, crosstalk interference can occur between the transmitted signals over adjacent twisted-pair phone lines, for example in a same or nearby bundle of lines. Crosstalk limits the performance of some DSL technologies, such as asymmetric DSL 2 (ADSL2) and very high bit rate DSL 2 (VDSL2). Crosstalk can occur in mixed deployment scenarios, where cabinet and exchange deployed lines operate within relatively short proximity or in the same binder. Downstream power back-off (DPBO) is a static spectrum management technique that is used to reduce crosstalk. However, DPBO is typically configured to reduce crosstalk and meet a single data-rate requirement. Since the signals are typically transmitted at different rates in the lines, the DPBO does not ensure service requirements, e.g. data-rate or quality of service (QoS) requirements, for each line. For example, if the DPBO performance is limited to a data-rate that is lower than the rate requirement for a cabinet deployed line, adequate service cannot be provided over that line. Alternatively, if the supported data-rate is higher than the rate requirement of a second cabinet deployed line, the DPBO scheme causes high power consumption and excess crosstalk in the second line. Dynamic spectrum management (DSM) is another technique based on optimizing the power spectrum density (PSD) of the transmitter (e.g. modem) to reduce crosstalk and achieve service requirements in multiple lines. However, the DSM technique uses algorithms that are difficult to implement practically because they typically require knowledge of the binder topology and the crosstalk channels in the network.

SUMMARY

In one embodiment, the disclosure includes an apparatus comprising a transmitter at a DSL Cabinet configured to transmit a downstream signal in a subscriber line according to a PSD configuration, wherein the PSD configuration comprises a cutoff frequency based on a required data-rate of the subscriber line.

In another embodiment, the disclosure includes an apparatus comprising at least one processor configured to implement a method comprising determining a downstream PSD for a PSD mask for a DSL, determining a cutoff frequency for the PSD profile based on a data-rate required for the DSL, and adjusting a downstream signal power on the DSL according to the PSD mask.

In yet another embodiment, the disclosure includes a method comprising configuring a plurality of transmitted PSDs for a plurality of Exchange deployed lines and Cabinet deployed lines by varying a plurality of cutoff frequencies corresponding to the transmitted PSDs, wherein the cutoff frequencies are varied by line, with time, or both.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for reducing crosstalk in a bundle of subscriber lines in DSL systems, such as ASDL2 and VDSL2 based networks. The subscriber lines may be deployed by an exchange server at a central office (CO) and a cabinet positioned between the CO and customer premises. The method may be an adaptive scheme based on DPBO to reduce the crosstalk between the lines and meet the service requirements of the individual lines, such as the data-rates for providing adequate services. To reduce crosstalk and meet the service requirements in the lines, the PSDs of the transmitted signals in the lines may be configured and optimized using an algorithm based on a cutoff frequency, which may vary according to the required data-rates in the lines. The algorithm may be relatively simple to implement and may not require information about the crosstalk channels or about the different lines in the bundle.

Figure 1:
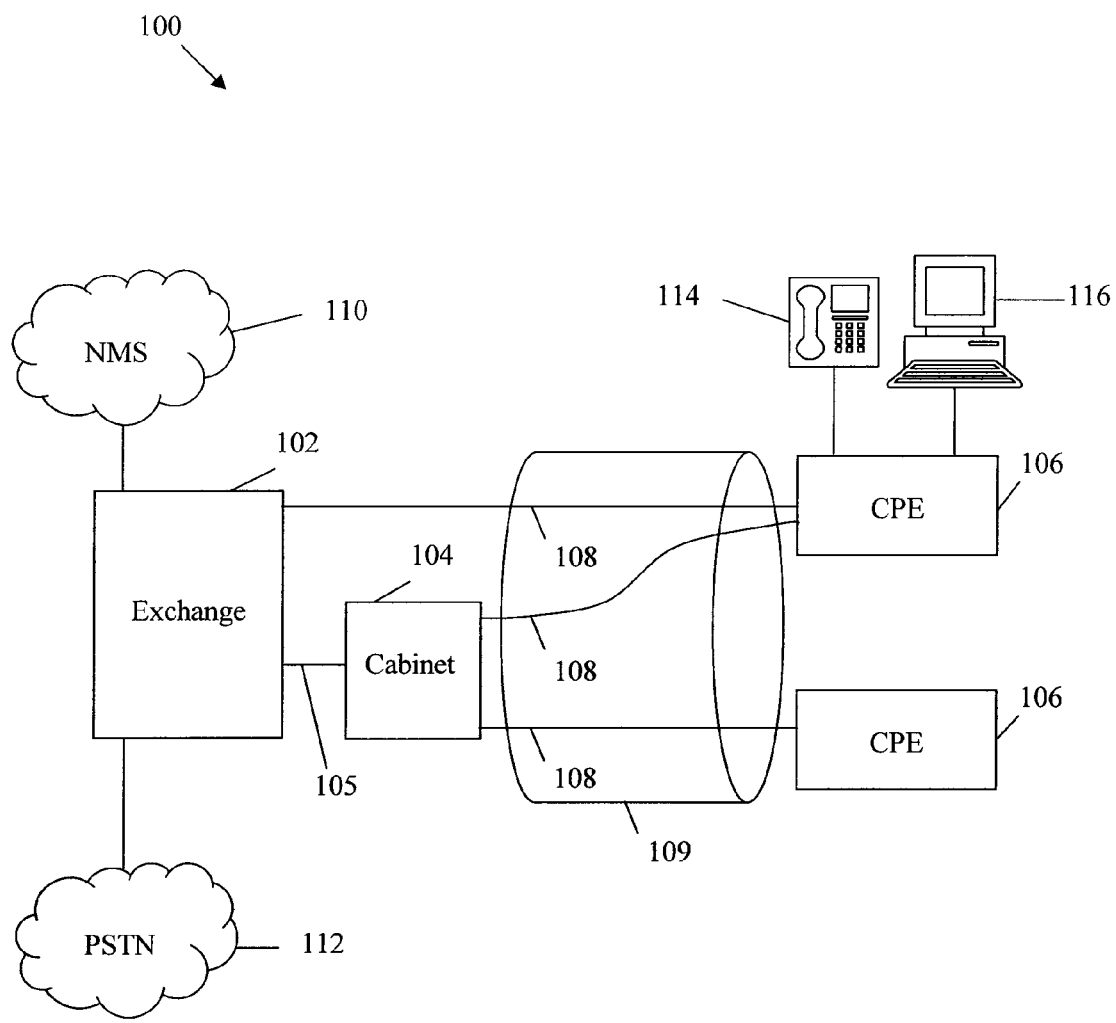
FIG. 1 is a schematic diagram of an embodiment of a DSL system.

FIG. 1 illustrates one embodiment of a DSL system 100. The DSL system 100 may be a VDSL2 system, an ADSL2 system, an ADSL2 plus (ADSL2+) system, or any other DSL system. The DSL system 100 may comprise an Exchange 102, a Cabinet 104 coupled to the Exchange 102 by a cable 105, and a plurality of customer premise equipments (CPEs)

106, which may be coupled to the Exchange 102 and/or the Cabinet 104 via a plurality of subscriber lines 108. At least some of the subscriber lines 108 may be bundled in a binder 109. Additionally, the DSL system 100 may optionally comprise a network management system (NMS) 110 and a public switched telephone network (PSTN) 112, both of which may be coupled to the Exchange 102. In other embodiments, the DSL system 100 may be modified to include splitters, filters, management entities, and various other hardware, software, and functionality.

The NMS 110 may be a network management infrastructure that processes data exchanged with the Exchange 102 and may be coupled to one or more broadband networks, such as the Internet. The PSTN 112 may be a network that generates, processes, and receives voice or other voice-band signals. In an embodiment, the Exchange 102 may be a server located at a central office and may comprise switches and/or splitters, which may couple the NMS 110, the PSTN 112, and the subscriber lines 108. For instance, the splitter may be a 2:1 coupler that forwards data signals received from the subscriber lines 108 to the NMS 110 and the PSTN 112, and forwards data signals received from the NMS 110 and the PSTN 112 to the subscriber lines 108. Further, the splitter may optionally comprise one or more filters to help direct data signals between the NMS 110, the PSTN 112, and the subscriber line 108. Additionally, the Exchange 102 may comprise at least one DSL transmitter/receiver (transceiver), which may exchange signals between the NMS 110, the PSTN 112, and the subscriber lines 108. The signals may be received and transmitted using the DSL transceiver, such as a modem. In an embodiment, the DSL transceiver may comprise a forward error correction (FEC) codeword generator that generates FEC data, an interleaver that interleaves the transmitted data across a plurality of tones, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the Exchange 102 may be configured to transmit data at similar or different rates for each subscriber line 108.

In an embodiment, the Cabinet 104 may be located at a distribution center between the CO and customer premises and may comprise switches and/or splitters, which may couple the Exchange 102 to the CPEs 106. For instance, the Cabinet 104 may comprise a DSL access multiplexer (DSLAM) that couples the Exchange 102 to the CPEs 106. Additionally, the Cabinet 104 may comprise a DSL transceiver, which may be used to exchange signals between the Exchange 102 and the CPEs 106. The DSL transceiver may process the received signals or may simply pass the received signals between the CPEs 106 and the Exchange 102. The splitter in the Cabinet 104 may be a N:1 coupler (where N is an integer) that routes data signals received from the Exchange 102 to N CPEs 106, and routes data signals received from the N CPEs 106 to the Exchange 102. The data signals may be transmitted and received using the DSL transceiver, which may be a modem. Further, the splitter of the Cabinet 104 may optionally comprise one or more filters to help direct data signals between the Exchange 102 and the CPEs 106 via the corresponding subscriber lines 108. In an embodiment, the DSL transceiver may be configured to transmit data to the CPEs 106 at similar or different rates and/or power for each subscriber line 108, as described in detail below.

In an embodiment, the CPEs 106 may be located at the customer premises, where at least some of the CPEs 106 may be coupled to a telephone 114 and/or a computer 116. The telephone 114 may be hardware, software, firmware, or combinations thereof that generates, processes, and receives voice or other voice-band signals. The CPE 106 may comprise a switch and/or a splitter, which may couple the subscriber lines 108 and the telephone 114 and the computer 116. The CPE 106 may also comprise a DSL transceiver to exchange data between the CPE 106 and the Exchange 102 via the subscriber line 108. For instance, the splitter may be a 2:1 coupler that forwards data signals received from the subscriber line 108 to the telephone 114 and the DSL transceiver, and forwards data signals received from the telephone 114 and the DSL transceiver to the subscriber line 108. The splitter may optionally comprise one or more filters to help direct data signals to and from the telephone 114 and the DSL transceiver. The DSL transceiver, e.g. a modem, may transmit and receive signals through the subscriber lines 108. For instance, the DSL transceiver may process the received signals to obtain the transmitted data from the Exchange 102, and pass the received data to the telephone 114, the computer 116, or both. The CPEs 106 may be coupled to the Exchange 102 directly via the subscriber lines 108 and/or via the subscriber lines 108 and the Cabinet 104. For example any of the CPEs 106 may be coupled to a subscriber line 108 from the Exchange 102 and/or a subscriber line 108 from the Cabinet 104. The CPEs 106 may access the NMS 110, the PSTN 112, and/or other coupled networks via the subscriber lines 108 deployed by the Exchange 102 and/or the Cabinet 104.

In an embodiment, the subscriber lines 108 may be telecommunications paths between the Exchange 102 and the CPE 106 and/or between the Cabinet 104 and the CPEs 106, and may comprise one or more twisted-pairs of copper cable. Crosstalk interference may occur between the tones or signals transported through the subscriber lines 108 that are deployed by the Exchange 102 and the Cabinet 104, e.g. in the binder 109. The crosstalk interference may be related to the power, frequency, and travel distance of the transmitted signals and may limit the communications performance in the network. For instance, when the PSD of the transmitted signals increase, e.g. over a range of frequencies, the crosstalk between the adjacent subscriber lines 108 may increase and hence the data-rates may decrease. To reduce or limit the crosstalk in the lines, the DSL transceiver of the Cabinet 104 may be configured to control and adjust the PSD of the signals or tones transmitted downstream, e.g. to the CPEs 106, in any of the subscriber lines 108. The DSL transceiver may be used to reduce the PSD of a transmitted signal in a line to ensure a sufficient data-rate that meets service requirements. The PSD may be controlled, e.g. using software, hardware, firmware, or combinations thereof, according to a PSD profile or mask to reduce crosstalk. The PSD mask may be optimized to meet the service requirements for any of the lines, such as the data-rate in the line.

Figure 2:
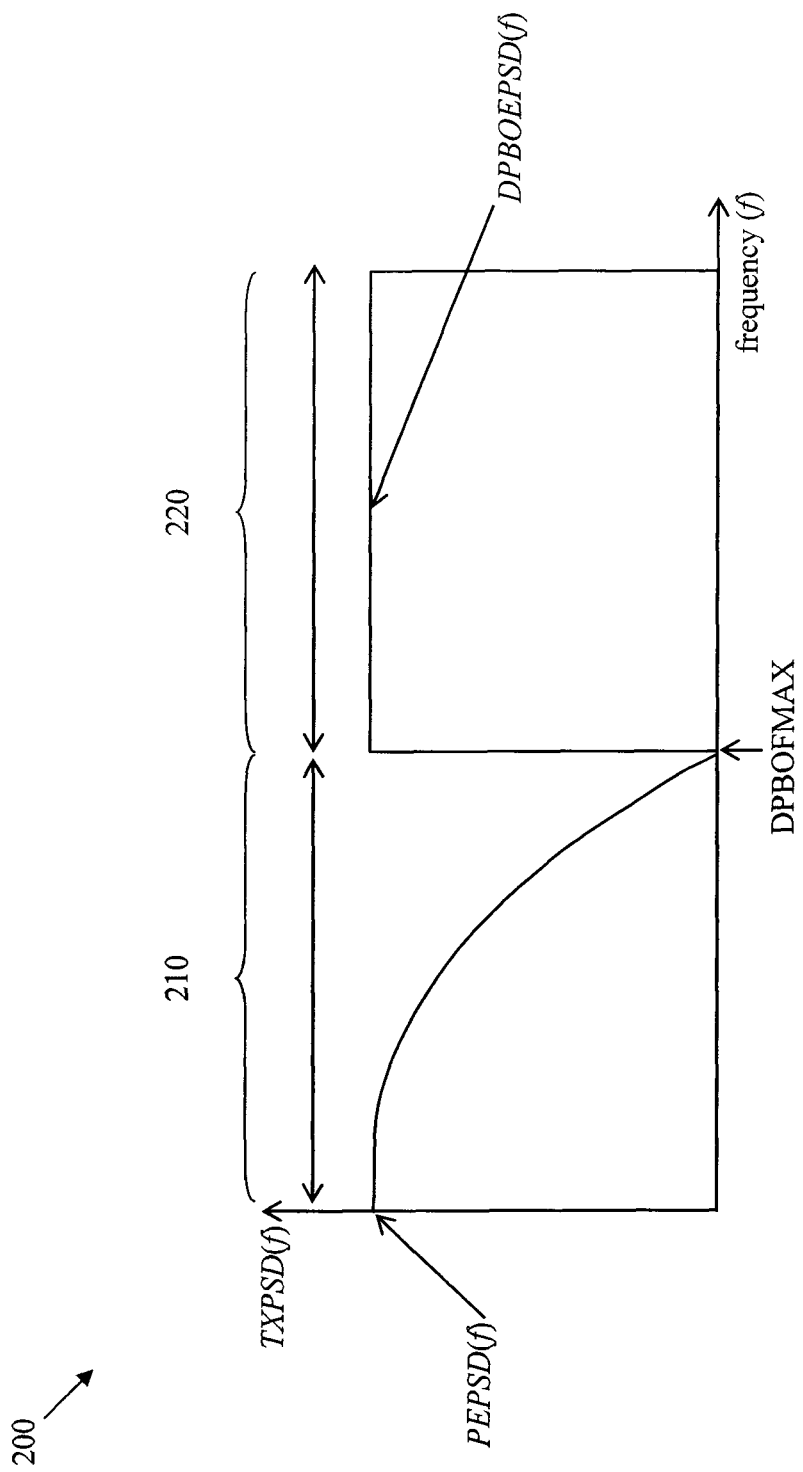
FIG. 2 is a chart of an embodiment of a PSD mask.

FIG. 2 illustrates an embodiment of a PSD mask 200, which may correspond to a configured power vs. frequency profile for a transmitted signal in a subscriber line. The PSD mask 200 may comprise a varying PSD portion 210 and a substantially constant PSD portion 220. The varying PSD portion 210 may correspond to frequencies less than or equal to about a cutoff frequency (maximum DPBO frequency or DPBOFMAX), where the transmitted PSD (TXPSD(f)) may decrease as the frequency (frequency(f)) increases. For example, the TXPSD(f) vs. frequency(f) curve of the varying PSD portion 210 may comprise a predicted downstream exchange PSD (PEPSD(F)), which may be constant over a short frequency range then decrease nonlinearly (or linearly). Generally, as the frequencies increase below the cutoff frequency, the crosstalk in the lines deployed by the Exchange and the Cabinet may increase. Thus, to reduce the crosstalk, the PSD of the signals transmitted from the Cabinet at the higher end of this range (closer to DPBOFMAX) may be decreased and the PSDs of the signals transmitted from the Exchange may be maintained.

In contrast, the substantially constant PSD portion 220 may correspond to frequencies greater than or equal to about DPBOFMAX, where TXPSD(f) may remain substantially constant as the frequency(f) increases. For example, the PEPSD(F) in the TXPSD(f) vs. frequency(f) curve of the substantially constant PSD portion 220 may be fixed and equal to about a DPBO exchange site maximum PSD (DPBOEPSD(f). At such range above the cutoff, the frequencies may be substantially high and may not be suitable for transmissions over relatively long distances from the Exchange to the CPEs due to dispersion effects. Consequently, such frequency channels may be dedicated to the lines from the Cabinet to the CPEs, which may allow for higher PSDs at a maximum limit, e.g. DPBOEPSD(f).

In an embodiment, the value PEPSD(F) in the TXPSD(f) vs. frequency(f) curve of the PSD mask 200, e.g. of the varying PSD portion 210 and the substantially constant PSD portion 220, may be calculated mathematically such as:

$$PEPSD(f) = DPBOEPSD(f) - $$
$$(DPBOESCMA + DPBOESCMB \cdot \sqrt{f} + DPBOESCMC \cdot f) \cdot$$
$$DPBOESEL,$$

and $$TXPSD(f) = \begin{cases} PEPSD(f), & f < DPBOFMAX \\ DPBOEPSD(f), & f \geq DPBOFMAX. \end{cases}$$

In the equations above, DPBOEPSD(f) may be a maximum limit of the PSD mask 200 for transmitting signals in the lines, DPBOESEL may be an electrical loop length of a cable between the Exchange and the Cabinet, and DPBOESCMA, DPBOESCMB, and DPBOESCMC may be parameters of a frequency response model of the cable. The equation above may be described in the International Telecommunication Union (ITU) G.997.1 standard for DSL physical layer management, which is incorporated herein by reference as if reproduced in its entirety.

Typically, in a conventional DPBO scheme for reducing crosstalk, the cutoff frequency DPBOFMAX may be fixed, for example equal to about 2.2 Megahertz (MHz). Such value may be chosen to meet a required data-rate in a single line deployed by the Cabinet, e.g. equal to about four megabits per second (Mbps) or about five Mbps. The PSDs may be configured for a single line that corresponds to that data-rate but not for other lines from the Cabinet. The conventional DPBO scheme may be relatively easy to implement and require substantially no or little knowledge about the binder topology of the lines (e.g. only the distance between the Exchange and the Cabinet). However, such scheme may not meet the multiple data-rate requirements at the Cabinet, for example in a modem. For example, if the data-rate supported using the optimized PSD is lower than the required data rate for a line, the line may not provide adequate service. Alternatively, if the supported data-rate is higher than the required data rate for a line, additional power may be unnecessarily consumed and crosstalk may be increased in the line.

Typically, to optimize the PSDs for a plurality of lines from the Cabinet, the total transmitted signal power in the lines may be configured using a DSM technique. Using DSM, the PSDs may be set based on the binder topology (e.g. the length of the different lines and cabinet location) and on the required rates of the lines. The DSM technique may be based on any of various DSM algorithms, such as iterative waterfilling, optical spectrum balancing, or iterative spectrum balancing. The iterative waterfilling algorithm may not require knowledge of the binder topology, but may yield poor performance in a mixed Exchange/Cabinet deployment scenario. The optical spectrum balancing and iterative spectrum balancing algorithms may yield optimal or near-optimal performance, but may require a centralized control, such as at a NMS, and measurements of crosstalk channels between the lines in the binder. The measurements of the crosstalk channels may increase management overhead and require additional memory. Additionally, such algorithms are relatively more complex and difficult to implement, e.g. when the quantity of lines in the network is relatively high.

In an embodiment, an adaptive scheme may be used instead of the conventional DPBO scheme to improve the PSD configuration and optimization and achieve reduced crosstalk. In the adaptive scheme, the cutoff frequency DPBOFMAX in the PSD mask may be varied for each line based on the required data-rates of the lines. For example, the PSDs of the lines that have different data-rates may be configured using PSD masks based on different DPBOFMAX values. The PSD values in the PSDs mask may be used to configure the PSDs to reduce the crosstalk between the lines, and the DPBOFMAX values in the PSD masks may be selected to optimize the PSDs to meet the required data-rates of the lines. As such, without using a DSM technique to optimize the PSDs, an adaptive scheme may be implemented to minimize or reduce the crosstalk and the power consumption in the lines and to meet the service requirements of the lines. The adaptive scheme may be based on DPBO, and hence may be simple to implement in comparison to the DSM technique. For example, the adaptive scheme may require the distance between the Exchange and the Cabinet, but not the knowledge of other binder topology. Additionally, the adaptive scheme may require less memory requirements in comparison to the DSM technique.

Figure 3:
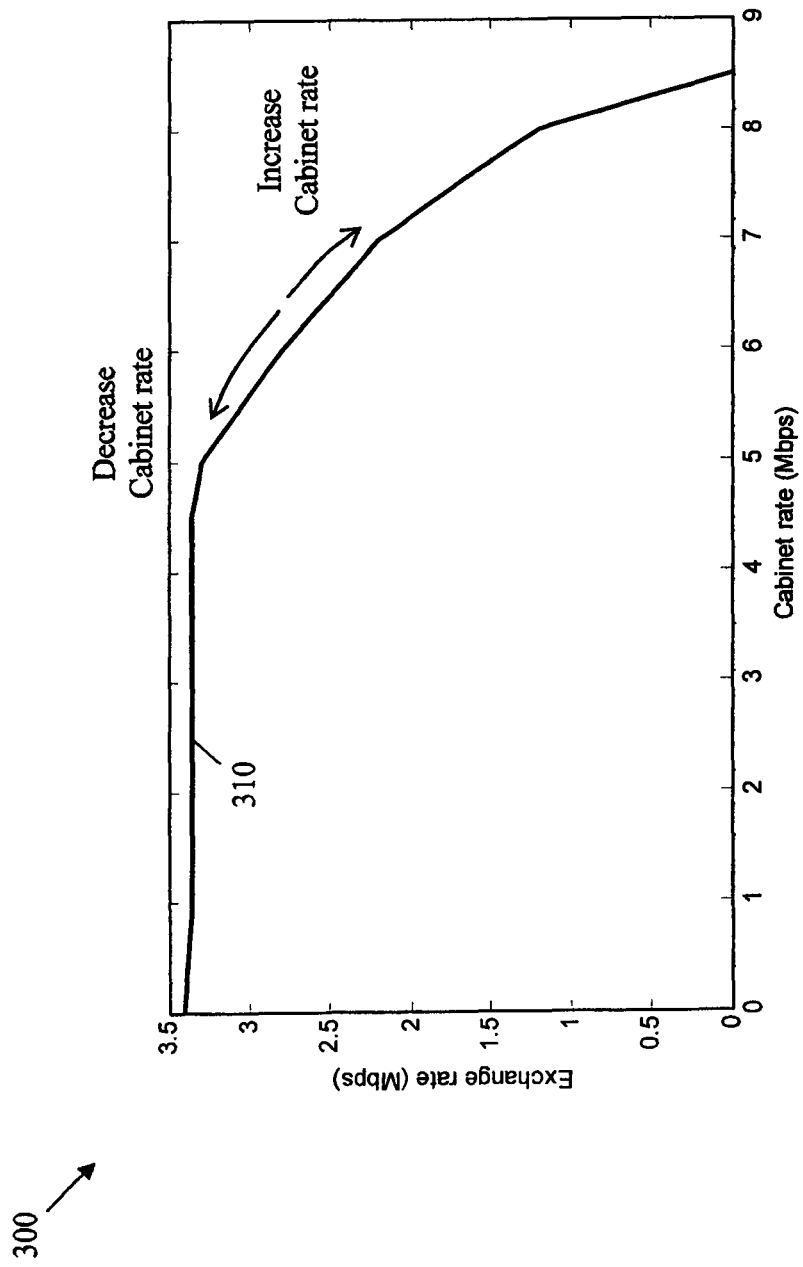
FIG. 3 is a chart of an embodiment of an Exchange/Cabinet rate tradeoff.

FIG. 3 illustrates an embodiment of an Exchange/Cabinet rate tradeoff 300 between a plurality of Exchange and Cabinet deployed lines. The Exchange/Cabinet rate tradeoff 300 is represented by a curve 310 that comprises a plurality of points. The curve 310 represents Exchange rate and Cabinet rate pairs configured using a conventional DPBO scheme. The points correspond to a compromise between Exchange rate and Cabinet rate pairs to limit crosstalk in the lines. Accordingly, when the frequency channels in the Exchange deployed lines and the Exchange rates are increased, the frequency channels in the Cabinet deployed lines and the Cabinet rates are decreased to reduce the crosstalk. For example, when the Exchange rate in an Exchange deployed line for a CPE is relatively low, e.g. equal to about one Mbps, the Cabinet rate in a Cabinet deployed line for the CPE may be relatively high, e.g. equal to about eight Mbps. In comparison, when the Exchange rate for a second CPE is higher, e.g. equal to about three Mbps, the Cabinet rate for the second CPE may be lower, e.g. equal to about 5.5 Mbps.

Using a conventional DPBO, the configured PSDs may meet a data-rate requirement in a single line, which may correspond to a single point on the curve 310. In contrast, the adaptive scheme may be used to optimize the PSDs to reduce crosstalk and meet a plurality of data-rates in a plurality of lines, which may correspond to a plurality of points on the curve 310. The adaptive scheme may be used by varying the cutoff frequency, e.g. DPBOFMAX in the equations above, to match the data-rates in the lines. For example, the DPBOFMAX value may be reduced for higher Cabinet rates (on the ride side of the curve 310) or may be increased for lower Cabinet rates (on the left side of the curve 310). Thus, the PSDs may be optimized according to the required data-rates in the Cabinet deployed lines and the data-rates in the Exchange deployed lines may be maintained.

In an embodiment, the PSD may be determined for a line based on the channel signal to noise ratio (SNR) of the line. The channel SNR of the line (CSNR(i)) may be based on a reported SNR per-subcarrier (SNRpsds(i)) and a downstream PSD (TXPSD(i)), such as $$CSNR(i) = \frac{SNRpsds(i)}{TXPSD(i)}.$$

Next, a bitloading (b(i)) for the line may be determined using TXPSD(i)) and CSNR(i), such as $$b(i)=f(TXPSD(i),CSNR(i)).$$

For example, b(i) may be calculated using a SNR-gap analysis, such as $$b(i) = \log_2\left(1 + \frac{CSNR(i) \cdot TXPSD(i)}{\Gamma}\right),$$

where $\Gamma$ is the SNR gap to capacity. The bitloading may then be used to find the appropriate cutoff frequency DPBOFMAX for the line that may provide a data-rate substantially equal or close to the required data-rate.

In an embodiment, the DPBOFMAX value may be calculated based on an algorithm that may be implemented using hardware, software, firmware, or combinations thereof. The algorithm may configure the PSD mask (e.g. PSD mask 200) for the line and comprise the following executable instructions:

---

DPBOFMAX_tol = 4.3125 kHz
DPBOFMAX_min = 138 kHz
DPBOFMAX_max = 2208 kHz
while (DPBOFMAX_max − DPBOFMAX_min) > DPBOFMAX_tol
    DPBOFMAX = (DPBOFMAX_min + DPBOFMAX_max)/2

$$TXPSD(f) = \begin{cases} PEPSD(f) & , f < DPBOFMAX \\ DPBOEPSD(f) & , f \geq DPBOFMAX \end{cases}$$

if R > $R_{target}$
    DPBOFMAX_min = DPBOFMAX
else
    DPBOFMAX_max = DPBOFMAX
  end
end.

---

In the algorithm above, f(i) is the frequency of a tone i in the line, and $R_{target}$ is the required data-rate of the line. The algorithm may be implemented at the Cabinet, such as a DSLAM, or at the NMS. Alternatively, the algorithm may be implemented in a DSL chipset, e.g. using firmware. The PSD for downstream transmission may be adjusted using a gain parameter $g_i$, such as $$g_i = \max\left(0.1888, \min\left(1.33, \sqrt{\frac{TXPSD(i)}{MREFPSD(i)}}\right)\right),$$

where MREFPSD(i) is a MEDLEY reference PSD on a linear scale and TXPSD(i) is calculated as indicated above. The value 0.1888 in the equation above may be a lower bound and the value 1.33 may be an upper bound for the $g_i$ values allowed, e.g. according to the ITU Telecommunication Standardization Sector (ITU-T) G.993.2 standard for VDSL2 implementation, which is incorporated herein by reference as if reproduced in its entirety.

In an embodiment, the DPBOFMAX value may be varied, e.g. in a dynamic manner, to maintain the required data-rate of the line over a time period or a showtime. For instance, during showtime, the gain parameter $g_i$ may be updated using bitswap or seamless rate adaptation (SRA). In some cases, regulatory constraints may limit the minimum value allowed for the cutoff frequency. Such constraint may be incorporated in the adaptive scheme for reducing crosstalk, e.g. by setting DPBOFMAX_min in the algorithm above to the minimum value allowed for DPBOFMAX.

Figure 4:
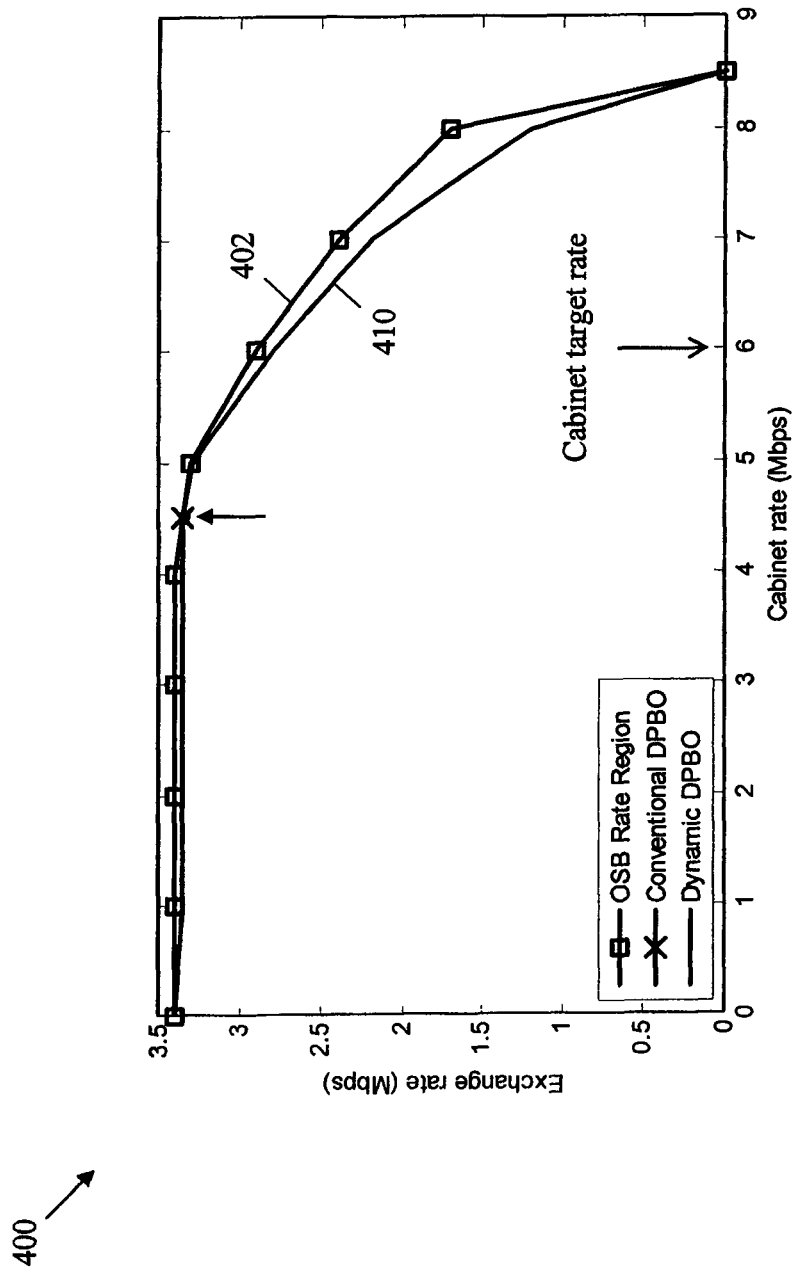
FIG. 4 is a chart of an embodiment of an Exchange/Cabinet rate optimization.

FIG. 4 illustrates another embodiment of an Exchange/Cabinet rate optimization 400 between a plurality of Exchange and Cabinet deployed lines. The Exchange/Cabinet rate optimization 400 is represented by a curve 402 that comprises a plurality of points. The points correspond to Exchange rate and Cabinet rate pairs in the lines, where the PSDs have been optimized. The points correspond to eight Exchange deployed lines that have a distance equal to about five kilometers (km) and eight Cabinet deployed lines that have a distance equal to about three km. The Cabinet is located at about four km from the Exchange. Specifically, the PSDs were optimized using the adaptive scheme described above by varying the cutoff frequency to match the data-rates in the lines. For example, to optimize the PSDs for the higher Cabinet rates in the curve 402, the adaptive scheme was used to reduce the DPBOFMAX value. Alternatively, to optimize the PSDs of the lower Cabinet rates, the DPBOFMAX value was increased.

The curve 402 may be compared to a curve 410 that represents Exchange rate and Cabinet rate pairs configured using a conventional DPBO scheme, e.g. similar to the curve 310. Unlike the curve 402, the curve 410 may meet data-rate requirements for a single Exchange rate and Cabinet rate pair (denoted by "x"), which corresponds to the conventional DPBO scheme (e.g. at about 2.2 MHz). The supported Exchange rate and Cabinet rate pair on the curve 410 may match another point on the curve 402, which corresponds to an optimized PSD using the adaptive scheme. However, the remaining points on the curve 410 may not meet the data-rate requirements for other Exchange rate and Cabinet rate pairs. Consequently, a Cabinet target rate equal to about 6 Mbps (indicated by an arrow) may be supported using the adaptive scheme but not the conventional DPBO scheme.

Figure 5:
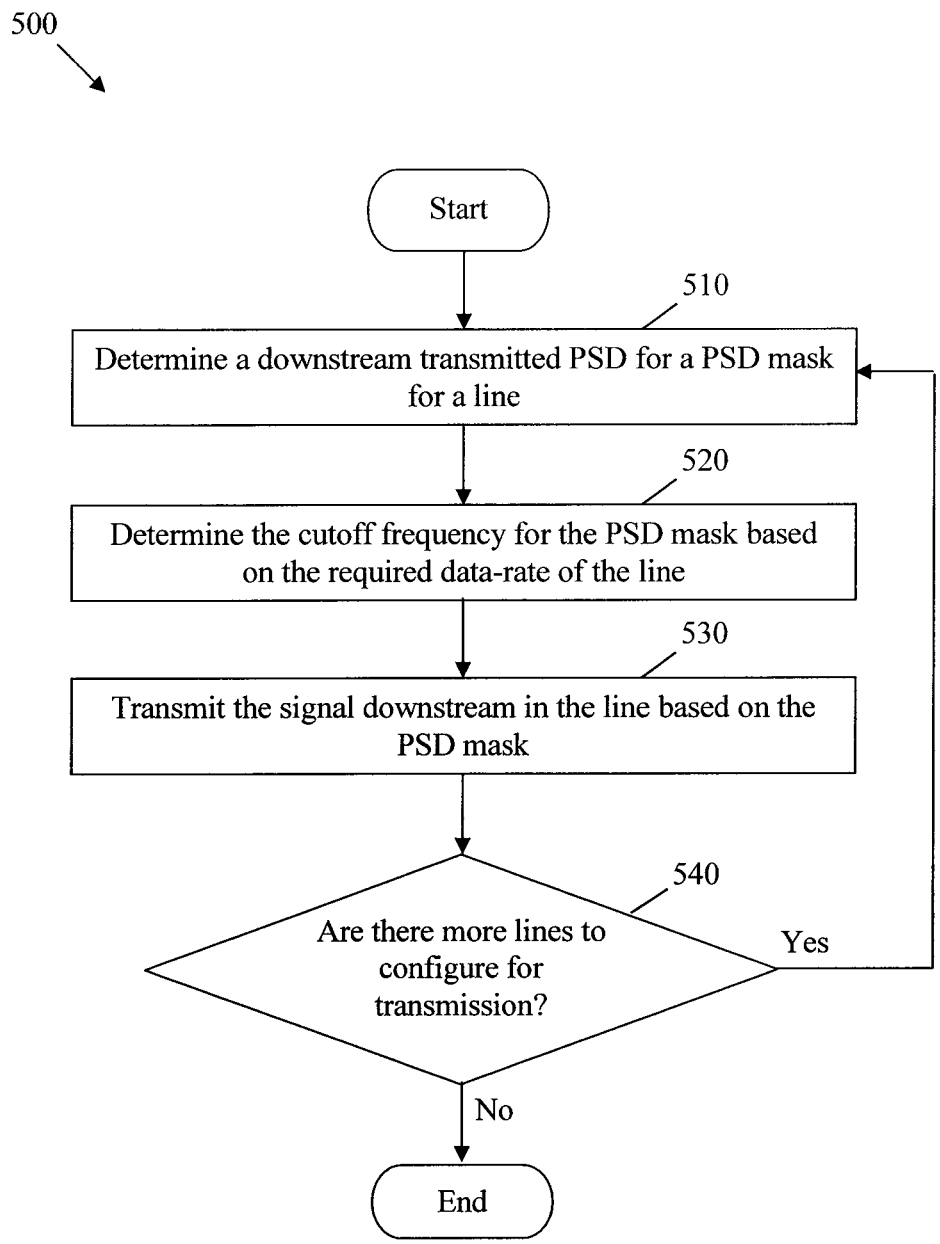
FIG. 5 is a flowchart of an embodiment of a PSD optimization method.

FIG. 5 illustrates an embodiment of a PSD optimization method 500, which may be used to configure the PSD masks in a plurality of Exchange and Cabinet deployed lines. The PSD masks may be used to configure the PSDs to reduce the crosstalk between the lines. The PSD optimization method may also configure the cutoff frequencies in the PSD masks to optimize the PSDs to meet the required data-rates in the lines. Adjusting the PSDs to reduce crosstalk and meet the required data-rates in the lines may also limit or reduce unnecessary power consumption in the lines. The method 500 may begin at block 510, where a downstream PSD may be determined for a PSD mask for a line. For instance, the downstream PSD (e.g. TXPSD(f)) may be determined based on the frequency (f), a maximum limit of the PSD mask (e.g. DPBOEPSD), the electrical loop length of a cable between the Exchange and the Cabinet (e.g. DPBOESEL), and parameters of the frequency response of the cable (e.g. DPBOESCMA, DPBOESCMA, and DPBOESCMA).

Next, at block 520, the cutoff frequency for the PSD mask may be determined based on the required data-rate of the line. For instance, the cutoff frequency parameter (e.g. DPBOF-MAX) may be determined based on a plurality of parameters, including the downstream PSD (e.g. TXPSD(f)), a SNR per-subcarrier (e.g. SNRpsds(i)), and a bitloading (e.g. b(i)). The cutoff frequency value may be calculated using such parameters and the required data-rate of the line (e.g. $R_{target}$) based on an adaptive scheme algorithm, as described above. Next, at block 530, the signal may be transmitted downstream in the line based on the PSD mask. In some embodiments, the signals' PSD may also be adjusted using a gain parameter (e.g. $g_i$), as described above. At block 540, the method 500 may determine if there are more lines to configure for transmission. If the condition in block 540 is met, the method 500 may return to block 510 to configure the PSD mask for the remaining line based on the line's required data rate and hence transmit the signal. Otherwise, the method 500 may end.

Figure 6:
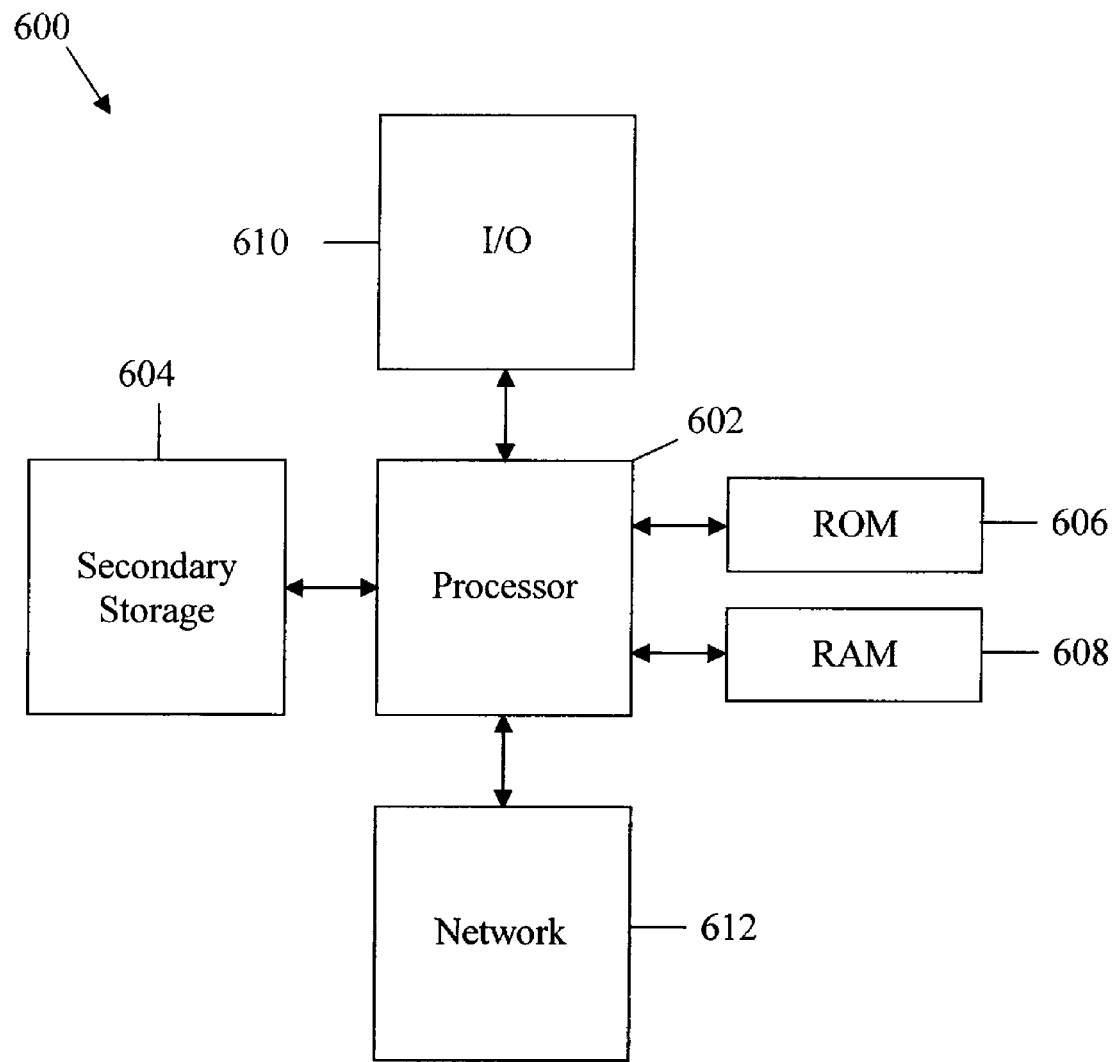
FIG. 6 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 may include a processor 602 (which may be referred to as a central processor unit or CPU) that is in communication with any memory devices including secondary storage 604, read only memory (ROM) 606, random access memory (RAM) 608, input/output (I/O) devices 610, and network connectivity devices 612, or combinations thereof. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a transmitter at a digital subscriber line (DSL) Cabinet configured to transmit a downstream signal in a subscriber line according to a power spectral density (PSD) configuration,
   wherein the PSD configuration comprises a cutoff frequency based on a required data-rate of the subscriber line,
   wherein the PSD configuration further comprises a reduced PSD portion that is substantially lower than a frequency-dependent maximum limit for all frequencies in the PSD configuration below the cutoff frequency and a maximum PSD portion for all frequencies in the PSD configuration above the cutoff frequency, wherein the reduced PSD portion decreases as frequency increases, and wherein the maximum PSD portion is substantially equal to the maximum limit.

2. The apparatus of claim 1, wherein the subscriber line couples the Cabinet to a customer premise equipment (CPE).

3. The apparatus of claim 2, wherein the Cabinet is coupled to an Exchange, and wherein the Exchange is coupled to the CPE via a second subscriber line.

4. The apparatus of claim 3, wherein the subscriber line and the second subscriber line are bundled in a binder.

5. The apparatus of claim 3, wherein the binder further comprises a plurality of subscriber lines between the Cabinet and a plurality of CPEs and a plurality of second subscriber lines between the Exchange and the CPEs.

6. The apparatus of claim 5, wherein the subscriber lines are longer than the second subscriber lines.

7. The apparatus of claim 5, wherein the required data rates of the subscriber lines increase as the required data rates for the second subscriber lines decrease.

8. An apparatus comprising:
at least one processor configured to:
determine a downstream power spectrum density (PSD) for a PSD mask for a digital subscriber line (DSL);
determine a cutoff frequency for the PSD based on a data-rate required for the DSL; and
adjust a downstream signal power on the DSL according to the PSD mask,
wherein the PSD mask comprises a reduced PSD portion that is substantially lower than a frequency-dependent maximum limit for all frequencies in the PSD mask below the cutoff frequency and a maximum PSD portion for all frequencies in the PSD mask above the cutoff frequency,
wherein the maximum PSD portion is substantially equal to the maximum limit, and
wherein the reduced PSD portion decreases as frequency increases.

9. The apparatus of claim 8, wherein the downstream PSD is determined by $$PEPSD(f) = DPBOEPSD(f) - \left(DPBOESCMA + DPBOESCMB \cdot \sqrt{f} + DPBOESCMC \cdot f\right) \cdot DPBOESEL,$$

and $$TXPSD(f) = \begin{cases} PEPSD(f), & f < DPBOFMAX \\ DPBOEPSD(f), & f \geq DPBOFMAX, \end{cases}$$

where f is a frequency, TXPSD(f) is the downstream PSD, PEPSD(f) is a decreasing value of the varying PSD portion, DPBOEPSD(f) is the maximum limit of the maximum PSD portion, DPBOESCMA, DPBOESCMB, and DPBOESCMC are parameters of a frequency response of an Exchange to Cabinet cable, and DPBOESEL is an electrical loop length of the cable.

10. The apparatus of claim 8, wherein the cutoff frequency is determined based on the downstream signal, a signal to noise ratio (SNR) per-subcarrier, a bitloading for the DSL, and the data-rate required for the DSL.

11. The apparatus of claim 8, wherein the downstream signal power is adjusted without using dynamic spectrum management (DSM).

12. The apparatus of claim 8, wherein the cutoff frequency is determined at a network management system (NMS).

13. The apparatus of claim 8, wherein the cutoff frequency is determined at a DSL access multiplexer (DSLAM).

14. The apparatus of claim 8, wherein the downstream signal power is adjusted using bitswap or seamless rate adaptation (SRA).

15. A method comprising:
configuring a plurality of transmitted power spectrum densities (PSDs) for a plurality of Exchange deployed lines and Cabinet deployed lines by varying a plurality of cutoff frequencies corresponding to the transmitted PSDs,
wherein the cutoff frequencies are varied by line, with time, or both,
wherein each PSD comprises a reduced PSD portion that is substantially lower than a frequency-dependent maximum limit for all frequencies in the corresponding PSD below a corresponding cutoff frequency and maximum PSD portion for all frequencies in the corresponding PSD above the corresponding cutoff frequency,
wherein the reduced PSD portion decreases as frequency increases; and
wherein each maximum PSD portion is substantially equal to the corresponding maximum limit.

16. The method of claim 15, wherein the transmitted PSDs are configured based on an adaptive downstream power back-off (DPBO) scheme.

17. The method of claim 16, wherein the cutoff frequencies are varied to meet a plurality of corresponding target data-rates in the Cabinet deployed lines.

18. The method of claim 16, wherein the adaptive DPBO scheme does not require knowledge of the binder topology for the Exchange deployed lines and Cabinet deployed lines.

19. The method of claim 15, wherein the transmitted PSDs are configured to reduce crosstalk and meet a plurality of Exchange and Cabinet rate pairs.

20. A method comprising:
determining a cutoff frequency of a power spectral density (PSD) profile for a cabinet-deployed digital subscriber line (DSL) based on a required data rate of the DSL,
wherein the PSD profile comprises a reduced PSD portion for all frequencies in the PSD profile below the cutoff frequency and a maximum portion for all frequencies in the PSD profile above the cutoff frequency, and
wherein the reduced PSD portion decreases as frequency increases.

21. The method of claim 20, wherein determining the cutoff frequency comprises:
setting initial values of variables DPBOFMAX_max, DPBOFMAX_min, and DPBOFMAX_tol, wherein the initial values satisfy a constraint (DPBOFMAX_max−DPBOFMAX_min)>DPBOFMAX_tol;
for each subcarrier $f_k$, where k equals 1 to n, where n is a number of subcarriers:
determining a downstream channel signal-to-noise ratio (SNR) of the DSL Channel_SNR($f_k$) based on a reported SNR per subcarrier SNRpsds($f_k$);
iteratively repeating the following steps while (DPBOFMAX_max−DPBOFMAX_min)>DPBOFMAX_tol:
determining an intermediate cutoff frequency DPBOFMAX$_{int}$ as DPBOFMAX$_{int}$=(DPBOFMAX_min+DPBOFMAX_max)/2;

for each subcarrier $f_k$, where k equals 1 to n:
  determining a downstream transmit power spectral density (PSD) $TxPSD_{desired}(f_k)$ based on the intermediate cutoff frequency; and
  determining a bit loading $b_k$ based on Channel_SNR $(f_k)$ and $TxPSD_{desired}(f_k)$;
determining a rate R as $R=f_s\Sigma_k b_k$, where $f_s$ is a sampling frequency; and
if $R \geq R_{target}$, set DPBOFMAX_min equal to $DPBOFMAX_{int}$, and otherwise set DPBOFMAX_max equal to $DPBOFMAX_{int}$, where $R_{target}$ is the required data rate of the DSL; and
determining the cutoff frequency of the PSD profile as a final intermediate cutoff frequency produced by the iterative steps.

22. The method of claim 21, wherein the PSD profile TxPSD(f) is computed as $$TxPSD(f) = \begin{cases} PEPSD(f) & \text{if } f < DPBOFMAX \\ DPBOEPSD(f) & \text{if } f \geq DPOFMAX \end{cases},$$

where DPBOFMAX is the cutoff frequency, PEPSD(f) is the reduced PSD portion, and DPBOEPSD(f) is the maximum portion, and wherein PEPSD(f) is substantially lower than a frequency-dependent maximum limit and DPBOEPSD(f) is substantially equal to the maximum limit.

23. The method of claim 22, wherein determining $TxPSD_{desired}(f_k)$ comprises computing $$TxPSD_{desired}(f_k) = \begin{cases} PEPSD(f_k) & \text{if } f_k < DPBOFMAX_{int} \\ DPBOEPSD(f_k) & \text{if } f_k \geq DPBOFMAX_{int} \end{cases}.$$

24. The method of claim 23, wherein determining Channel_SNR $(f_k)$ comprises computing $$\text{Channel\_SNR}(f_k) = \frac{SNRpsds(f_k)}{TxPSD_{current}(f_k)},$$

where $TxPSD_{current}(f_k)$ is a downstream transmit PSD used to generate subcarriers of the reported SNR.

25. The method of claim 24, wherein determining the bit loading $b_k$ comprises computing $$b_k = \min\left(b_{max}, \log_2\left(1 + \frac{\text{Channel\_SNR}(f_k) \times TxPSD_{desired}(f_k)}{\Gamma}\right)\right),$$

where $b_{max}$ is a maximum allowable number of bits per subcarrier and $\Gamma$ is a SNR gap to capacity.

* * * * *